United States Patent
Giurgiu et al.

(10) Patent No.: US 11,886,179 B2
(45) Date of Patent: Jan. 30, 2024

(54) SYSTEMS AND METHODS FOR DETERMINING MACHINE USAGE SEVERITY

(71) Applicant: Caterpillar Inc., Peoria, IL (US)

(72) Inventors: Gavril A Giurgiu, Deerfield, IL (US);
Prashant M. Rai, Champaign, IL (US);
Kyle J. Cline, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/517,375

(22) Filed: Nov. 2, 2021

(65) Prior Publication Data

US 2023/0133940 A1    May 4, 2023

(51) Int. Cl.
G05B 23/02    (2006.01)

(52) U.S. Cl.
CPC ..... G05B 23/0283 (2013.01); G05B 23/0267 (2013.01)

(58) Field of Classification Search
CPC ............ G05B 23/0283; G05B 23/0286; G05B 23/0289; G05B 23/0267; G05B 13/0265; G05B 13/027; G05B 13/0275; G05B 13/028; G05B 13/0285; G05B 13/029; G05B 13/0295; G05B 13/04; G05B 2219/24019; G06N 20/00; G06Q 10/20
See application file for complete search history.

(56) References Cited

U.S. PATENT DOCUMENTS

| 7,496,475 B2 | 2/2009 | Byrne et al. |
| 9,430,882 B2 | 8/2016 | Ho |
| 10,657,454 B2 | 5/2020 | Singh et al. |
| 11,397,973 B1* | 7/2022 | Vijayan .................. G06N 20/20 |
| 2009/0254240 A1* | 10/2009 | Olsen, III .............. G07C 5/008 701/29.5 |

(Continued)

FOREIGN PATENT DOCUMENTS

WO    2019213177 A1    11/2019

OTHER PUBLICATIONS

Written Opinion and International Search Report for Int'l. Patent Appln. No. PCT/US2022/079016, dated Mar. 6, 2023 (12 pgs).

*Primary Examiner* — Son T Le
*Assistant Examiner* — Matthew W. Baca (57) ABSTRACT

A method for determining machine usage severity including collecting repair data for multiple machines over a repair time period and telematics data from sensors on the machines over an activity time period. The method can include calculating predictive features from the telematics data for each of the machines and creating a severity model based on the predictive features. The severity model can be validated with the predictive features and corresponding repair data for each of the machines. The method can include receiving telematics data from sensors on a deployed machine for a deployed period of time, calculating a plurality of machine predictive features from the telematics data, and feeding the machine predictive features into the severity model to calculate a severity score for the deployed machine. The method can include displaying a recommendation to perform maintenance on the deployed machine when the machine usage severity score exceeds a selected threshold.

17 Claims, 11 Drawing Sheets

(56) References Cited

U.S. PATENT DOCUMENTS

| | | | |
|---|---|---|---|
| 2010/0063668 A1* | 3/2010 | Zhang | G06Q 10/04 |
| | | | 701/29.5 |
| 2016/0078695 A1 | 3/2016 | Mcclintic et al. | |
| 2016/0093115 A1* | 3/2016 | Ahn | G06N 20/00 |
| | | | 701/29.3 |
| 2020/0103894 A1 | 4/2020 | Cella et al. | |
| 2020/0126326 A1* | 4/2020 | Lavie | G06Q 10/00 |
| 2020/0134574 A1 | 4/2020 | Ghosh et al. | |
| 2020/0349495 A1* | 11/2020 | Chougule | G06Q 50/01 |
| 2021/0247756 A1* | 8/2021 | Hirman | G01N 3/56 |
| 2021/0406707 A1* | 12/2021 | Resnick | G06N 20/00 |
| 2022/0366488 A1* | 11/2022 | Jordan | G06N 20/00 |

* cited by examiner

| | Asset Build Date | SMU (hour(s)) | Longevity (0-10) | Percent Work Time (%) | Average Fuel Rate (litre/hour) | Average Engine Speed (RPM) | Average Gear Shift Rate (count/h) | Average Forward Ground Speed (km/h) | Average Reverse Ground Speed (km/h) | Data Air Inlet Temp (deg C) | Engine Coolant Temp (deg C) | Severity (0-10) |
|---|---|---|---|---|---|---|---|---|---|---|---|---|
| 1 | — | ~6900 | 3.0 | 74.1 | 23.7 | 1243 | 286 | 4.0 | 1.2 | 2.5 | 82.1 | 4.5 |
| | | | | | *Similar Longevity (~10,000 SMU), very different Severity* | | | | | | | |
| 2 | 2017-08-07 | 9,893 | 4.3 | 89.3 | 36.4 | 1395 | 359 | 7.0 | 2.2 | 5.6 | 85.6 | 8.7 |
| 3 | 2015-04-22 | 10,577 | 4.6 | 46.5 | 14.4 | 995 | 179 | 1.7 | 0.6 | 2.0 | 80.7 | 0.7 |
| | | | | | *High Longevity (19,000 SMU), Low severity* | | | | | | | |
| 4 | 2014-09-02 | 19,046 | 8.3 | 73.9 | 18.1 | 1161 | 210 | 3.2 | 0.9 | 0.7 | 79.0 | 2.5 |
| | | | | | *Low longevity (2,300 SMU), High severity* | | | | | | | |
| 5 | 2017-06-23 | 2,310 | 0.9 | 79.9 | 28.1 | 1333 | 669 | 8.9 | 2.8 | 4.6 | 84.1 | 8.8 |

SYSTEMS AND METHODS FOR DETERMINING MACHINE USAGE SEVERITY

TECHNICAL FIELD

This patent application is directed to identifying machines in need of repair, and more specifically, to identifying machines that are subject to severe usage relative to other similar machines.

BACKGROUND

Machines, such as excavators, can perform more than one task or application. For each of those applications, the wear and tear on the machine can vary. In other words, different machines are subject to different usage severities. In addition to other factors such as machine age, utilization rate, type of work, or operator performance, a machine's usage severity can have an impact on when a machine needs to be serviced and when major system overhaul is warranted.

Efforts have been made to develop computerized systems to monitor machine usage and recommend maintenance based on the usage. For example, U.S. Pat. No. 9,430,882 to Ho, (hereinafter "Ho") describes a computerized maintenance management system to generate recommended maintenance and/or component replacement schedules based on vehicle operations data. Ho's system is based on condition based maintenance and/or age based maintenance. Condition and age based maintenance schedules do not necessarily account for application type, which has an effect on the wear and tear on a machine.

Thus, there is a need to account for machine usage severity when recommending machine maintenance and/or machine overhaul. The example systems and methods described herein are directed to overcoming one or more of the deficiencies described above and/or other problems with the prior art.

SUMMARY

In some embodiments, a method for determining machine usage severity can include collecting repair data for a plurality of machines over a repair time period and collecting telematics data from a plurality of sensors for each of the plurality of machines over an activity time period. The method can also include calculating a plurality of predictive features from the telematics data for each of the plurality of machines and creating a severity model based on the plurality of predictive features. The severity model can be validated with the plurality of predictive features and corresponding repair data for each of the plurality of machines. Telematics data can be received from a plurality of sensors on a deployed machine corresponding to a deployed period of time. The method includes calculating a plurality of machine predictive features from the telematics data for the deployed machine and feeding the plurality of machine predictive features for the deployed machine into the severity model to calculate a machine usage severity score for the deployed machine. The method can display a recommendation to perform maintenance on the deployed machine when the machine usage severity score exceeds a selected threshold.

According to some aspects, the severity model comprises a Euclidian distance model. In some aspects, the plurality of machine predictive features comprise average fuel rate, average forward ground speed, and average reverse ground speed. In some aspects, the method can further comprise selecting the plurality of predictive features, including: identifying features that correlate with repairs being performed within the repair time period beginning after the activity time period. In still further aspects, the repair time period is two months. In some aspects, validating the severity model comprises calculating a severity score for each of the plurality of machines and calculating a correlation between the severity score and each of the plurality of predictive features. According to some aspects, the machine usage severity score is presented on a scale of 0 to 10, and wherein the selected threshold is five.

In some embodiments, a system for determining machine usage severity can include one or more processors and one or more memory devices having instructions stored thereon. When executed, the instructions cause the one or more processors to collect repair data for a plurality of machines over a repair time period and collect telematics data from a plurality of sensors for each of the plurality of machines over an activity time period. The instructions can cause the processors to calculate a plurality of predictive features from the telematics data for each of the plurality of machines and create a severity model based on the plurality of predictive features. The severity model can be validated with the plurality of predictive features and corresponding repair data for each of the plurality of machines. Telematics data can be received from a plurality of sensors on a deployed machine corresponding to a deployed period of time. The instructions can cause the processors to calculate a plurality of machine predictive features from the telematics data for the deployed machine and feed the plurality of machine predictive features for the deployed machine into the severity model to calculate a machine usage severity score for the deployed machine. The instructions can also cause the processors to display a recommendation to perform maintenance on the deployed machine when the machine usage severity score exceeds a selected threshold.

In some embodiments, one or more non-transitory computer-readable media storing computer-executable instructions that, when executed by one or more processors, cause the one or more processors to perform operations. The operations can include collecting repair data for a plurality of machines over a repair time period and collecting telematics data from a plurality of sensors for each of the plurality of machines over an activity time period. The operations can also include calculating a plurality of predictive features from the telematics data for each of the plurality of machines and creating a severity model based on the plurality of predictive features. The severity model can be validated with the plurality of predictive features and corresponding repair data for each of the plurality of machines. Telematics data can be received from a plurality of sensors on a deployed machine corresponding to a deployed period of time. The operations can include calculating a plurality of machine predictive features from the telematics data for the deployed machine and feeding the plurality of machine predictive features for the deployed machine into the severity model to calculate a machine usage severity score for the deployed machine. The operations can further include displaying a recommendation to perform maintenance on the deployed machine when the machine usage severity score exceeds a selected threshold.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for determining machine usage severity in the form of a severity score between 0 and 10, or as a percentile between 0 and 100% with respect to a population of similar machines, for example. The severity score takes into account actual machine use to provide an indication of which machine(s) relative to others may require attention. Traditionally, machine age and/or utilization rate (e.g., hours/day) were used to indicate when a machine needed attention. However, these metrics do not take into account actual usage. Two machines with similar age and utilization rate can have very different severity scores. For example, the first machine might idle for three hours per day and the second might idle only one hour per day. Similarly, the first machine might only use 13 liters of fuel per hour while the second uses 25 liters of fuel per hour. In this example, the second machine would likely need attention before the first machine even though both machines are of similar age and have a similar utilization rate. The disclosed severity score helps to identify machines that can run longer before service is performed and those that may need attention earlier than would be predicted with traditional metrics. In addition, machine usage severity can help improve lease or insurance terms and resale value. Furthermore, multiple severity scores can be calculated for each component of a given machine (engine, drivetrain, final drive, etc.).

Figure 1:
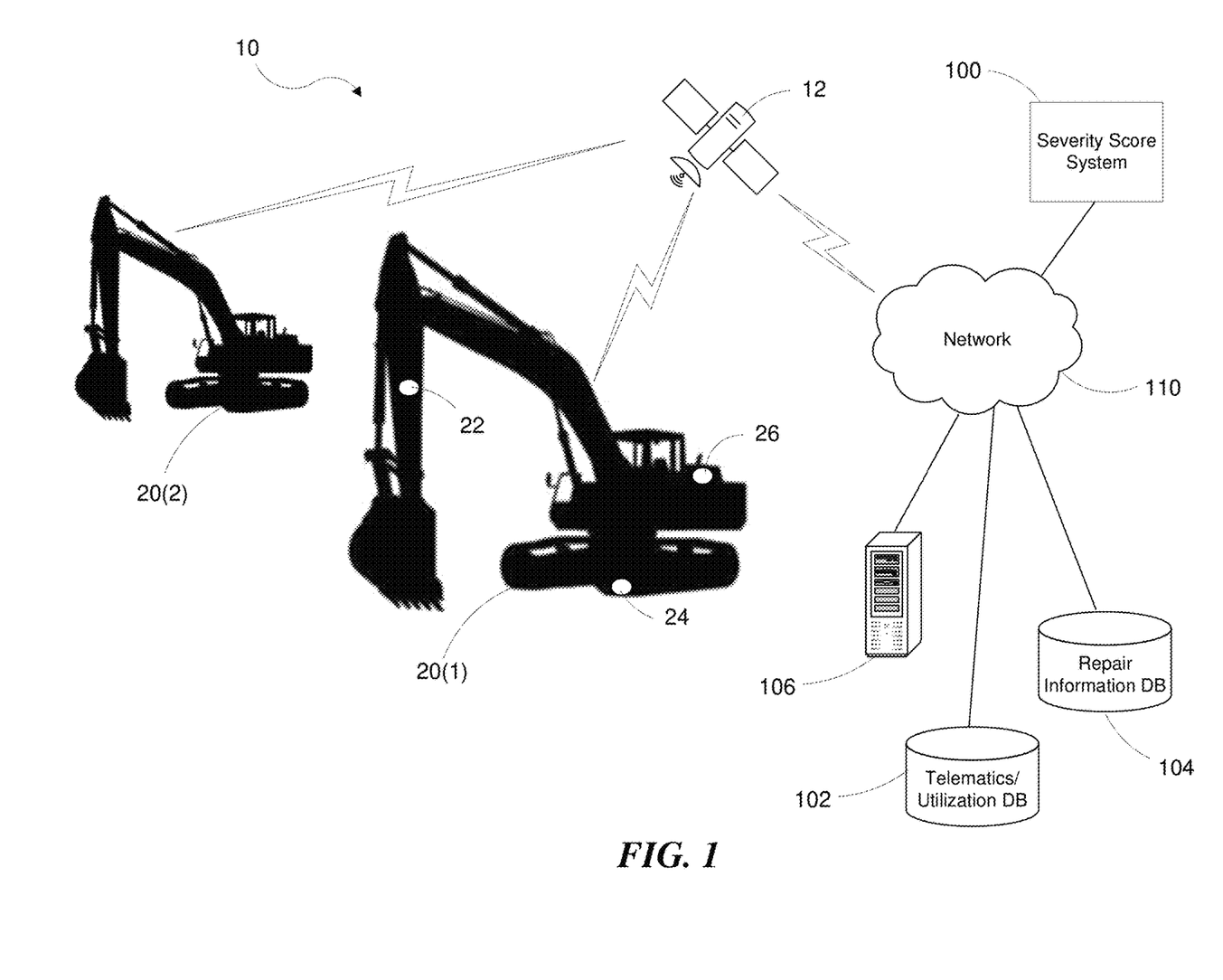
FIG. 1 is a diagram illustrating an overview of an environment in which some implementations can operate according to embodiments of the disclosed technology.

FIG. 1 illustrates an environment 10 in which some implementations of the severity score system 100 can operate according to embodiments of the disclosed technology. The system environment 10 can include multiple machines, such as excavators 20(1) and 20(2), a satellite 12, telematics/utilization database 102, a repair information database 104, a telematics processing system 106, and a network 110. The severity score system 100 can be connected to the telematics/utilization database 102, the repair information database 104, and the telematics processing system 106 via network 110. The telematics/utilization database 102 and the telematics processing system 106 can receive telematics data from the excavators 20(1) and 20(2) via satellite 12. The telematics data can include sensor data from the excavators, such as from a pressure sensor 22, a vibration sensor 24, and a temperature sensor 26, to name a few.

In some embodiments, the telematics processing system 106 determines a machine utilization pattern for the machines based on the telematics data. For example, a machine learning model (such as a neural network) can be applied to estimate each machine's utilization pattern based on telematics data (i.e., telemetry data). As an example, an excavator can have a use pattern of activities including 50% mass excavation, 20% grading, and 30% tracking (i.e., traveling from place to place).

In some embodiments, a utilization model can use mathematical models that classify equipment activity or application frequencies, which can include regression, support vector machines, and neural nets, depending on the level of detail and complexity required. These models may differentiate between, for example, mass excavation, dirt moving, trenching, scraping, grading, loading, tracking, or idle time. Models may supplement standard telematics data with additional sensors to measure the intensity of use. In some embodiments, the resulting machine utilization patterns, or activity data, can be provided to the severity score system 100.

Figure 2:
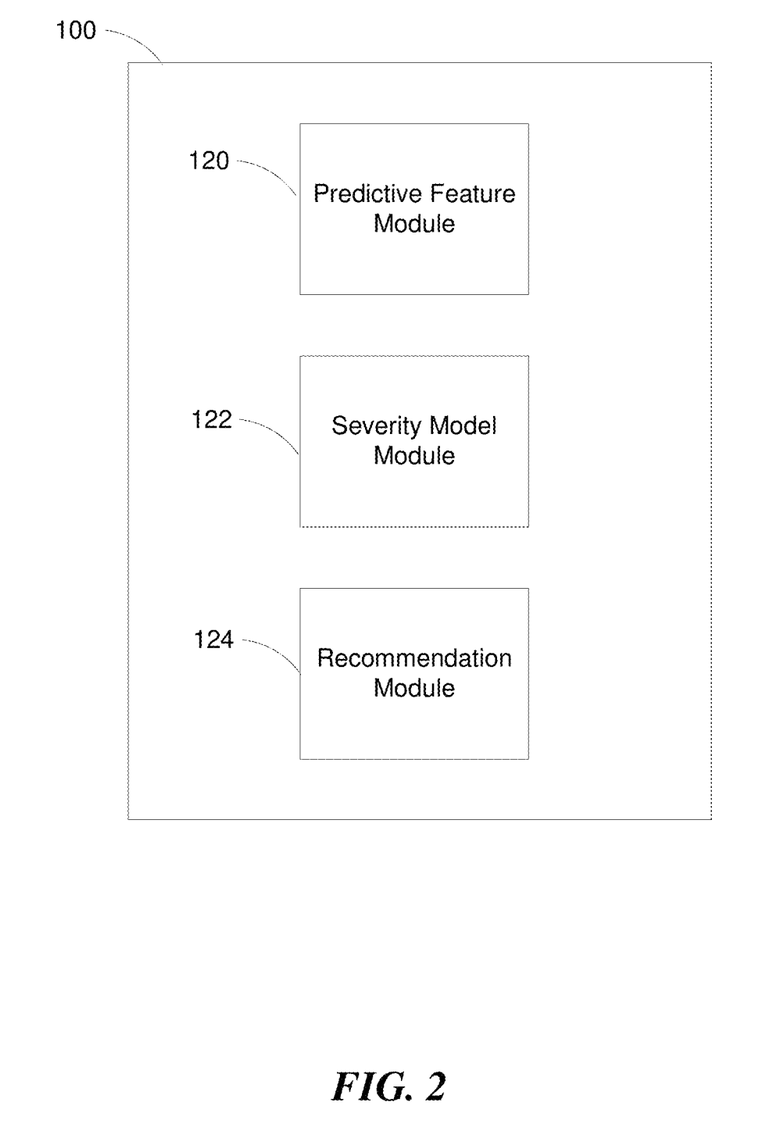
FIG. 2 is a block diagram illustrating an overview of a severity score system according to some embodiments of the disclosed technology.

As shown in FIG. 2, the severity score system 100 can comprise a predictive feature module 120, a severity model module 122, and a recommendation module 124. In some embodiments, the predictive feature module 120 can be configured to select a plurality of predictive features by identifying features that correlate with repairs being performed within a selected time period e.g., two months. Some examples of predictive features include, without limitation, Percent Work Time, Average Fuel Rate, Average RPM, Average Gear Shift Rate, Average Forward Ground Speed, Average Reverse Ground Speed, Engine Coolant Temperature, Delta Air Inlet Temperature (Air Inlet Temperature—Median Air Inlet Temperature), and the like.

The severity model module 122 can be configured to collect repair data and telematics data from a plurality of machines and calculate the selected predictive features from the telematics data. The severity model module 122 can also be used to create a severity model based on the plurality of predictive features. The severity model can be validated with the plurality of predictive features and corresponding repair data for each of the plurality of machines.

The recommendation module 124 can be configured to receive telematics data from a deployed machine and calculate the predictive features for the deployed machine. The predictive feature values can be fed into the severity model to calculate a machine usage severity score for the deployed machine. Module 124 can also be configured to display a recommendation to perform maintenance on the deployed machine when the machine usage severity score exceeds a selected threshold. In some embodiments, the system can display a recommendation to perform maintenance on the deployed machine when the machine usage severity score exceeds a selected threshold based on usage severity combined with other factors such as machine age, utilization rate, type of work or operator performance.

Figure 3:
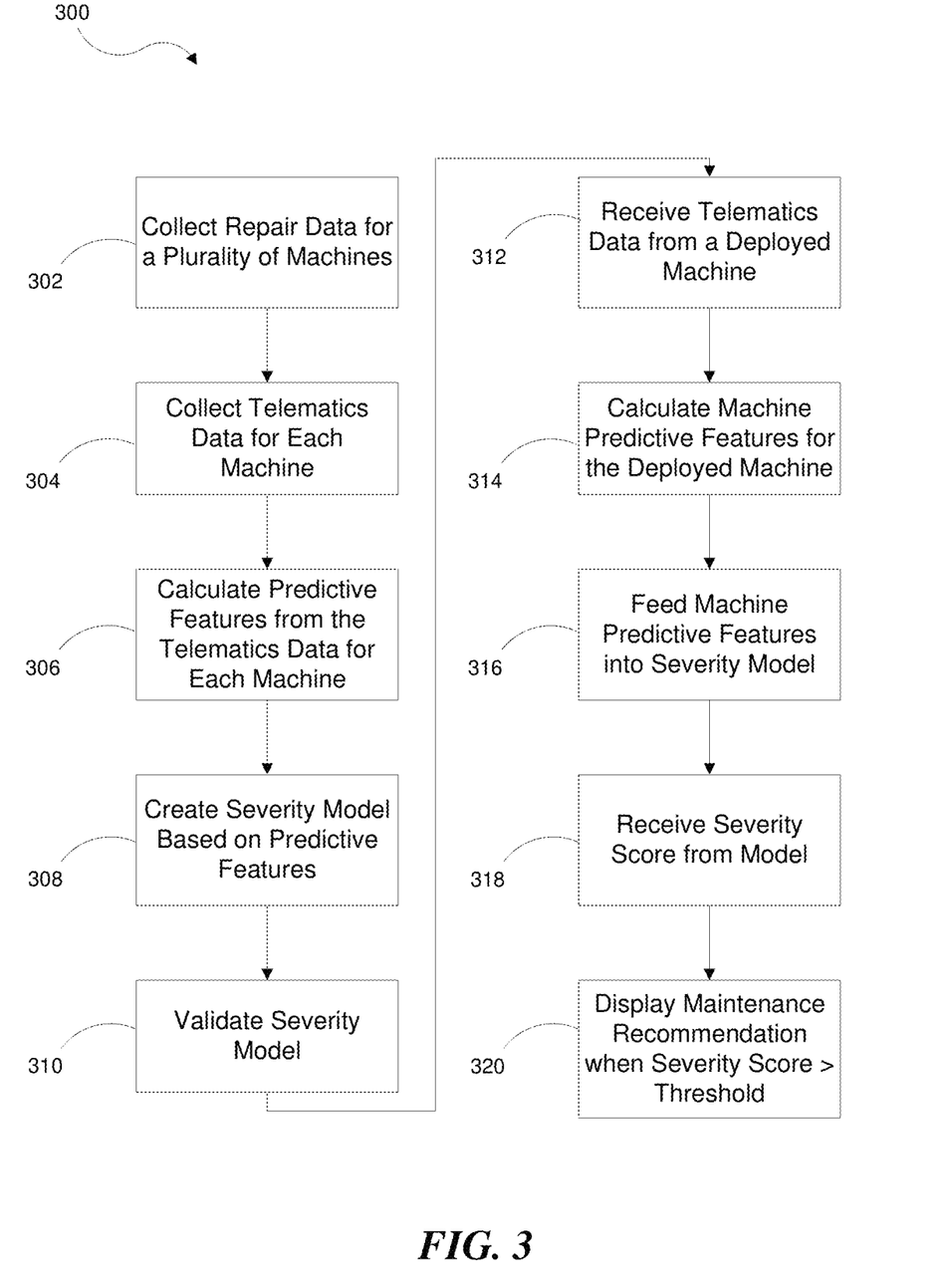
FIG. 3 is a flow diagram showing a method for determining machine usage severity according to some embodiments of the disclosed technology.

FIG. 3 is a flow diagram showing a method 300 for determining machine usage severity according to some embodiments of the disclosed technology. The method 300 can include collecting repair data for a plurality of machines over a repair time period at step 302. At step 304, telematics data can be collected from a plurality of sensors for each of the plurality of machines over an activity time period. The method 300 can also include calculating a plurality of predictive features from the telematics data for each of the plurality of machines at step 306 and creating a severity model based on the plurality of predictive features at step 308. In some embodiments, the severity model can comprise a Euclidian distance model.

One example of aggregating the predictive feature into a Severity Score is a Euclidian distance in the feature space, where features are scaled within a range such as

[0,1]: $S=\sqrt{\Sigma F_i^2}$

Where S is the severity score and $F_i$ are the scaled predictive features. In some embodiments, the severity can be quantified using other metrics in the feature space, such as Manhattan or Mahalanobis distance, or other feature aggregation methods such as a scaled feature weighted average or a feature percentile weighted average.

In some embodiments, the severity model can comprise an aggregation of multiple predictive features into one Severity score. The predictive features can include various statistics (such as average, standard deviation, higher order moments, percentiles, etc.) of different machine and environment characteristics, including, but not limited to: engine idle time, fuel rate, engine speed, gear shift rate, forward/reverse ground speed, engine coolant temperature, ambient temperature, type of ore being extracted, etc. The features may be scaled, for example within the [0,1] range and aggregated as a weighted average of the scaled features. Other aggregation models involve calculating various distances in the feature space, such as a Euclidian distance. Features can be decorrelated using techniques such as Principal Component Analysis.

In some embodiments, a machine learning classification model can be trained to identify "healthy" and "un-healthy" asset states. Different classifiers can be used to calculate an "un-healthy" probability, such as Logistic Regression, Random Forest, and Gradient Boosting, for example. Severity can be defined as a probability of "un-healthy" asset state.

At step 310, the severity model can be validated with the plurality of predictive features and corresponding repair data for each of the plurality of machines. In some embodiments, validating the severity model can include calculating a severity score for each of the plurality of machines and calculating a correlation between the severity scores and each of the plurality of predictive features.

Telematics data can be received from a plurality of sensors on a deployed machine corresponding to a deployed period of time at step 312. The method 300 can include calculating a plurality of machine predictive features from the telematics data for the deployed machine at step 314 and feeding the plurality of machine predictive features for the deployed machine into the severity model at step 316 to receive a machine usage severity score for the deployed machine at step 318. In some embodiments, the method 300 can display a recommendation to perform maintenance on the deployed machine when the machine usage severity score exceeds a selected threshold at step 320. According to some aspects, the machine usage severity score is presented on a scale of 0 to 10, and wherein the selected threshold is five. In addition, machine usage severity could be used to improve Customer Value Agreements, lease or insurance terms, better calculate machine resale value, improve machine maintenance schedule, inform fleet managers about the status of the machines under their supervision.

In some embodiments, the method 300 can further comprise selecting the plurality of predictive features, including: identifying features that correlate with repairs being performed within the repair time period, e.g., two months, beginning after the activity time period. In some embodiments, the plurality of machine predictive features can comprise average fuel rate, average forward ground speed, and average reverse ground speed. In some embodiments, the repair time period can range from one to three months, for example.

Figure 4A:
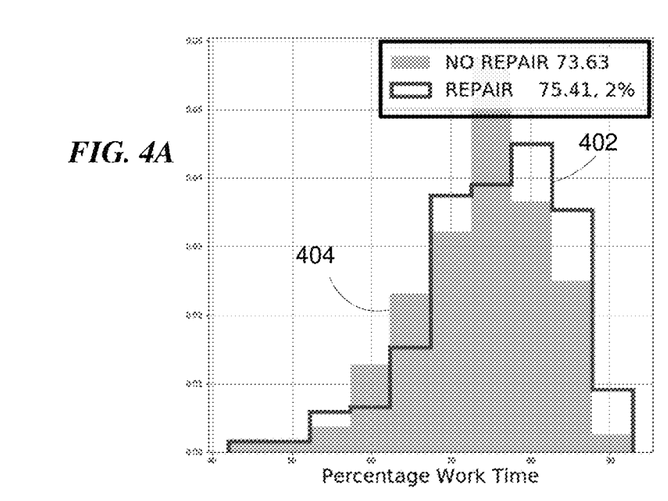
FIGS. 4A-D are charts illustrating probability distributions of various predictive features for asset states close to repair time and for asset states far from repair time.
Figure 4B:
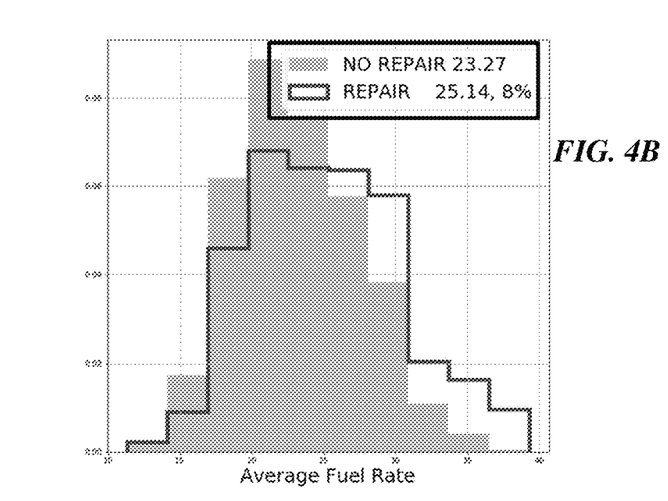
Figure 4C:
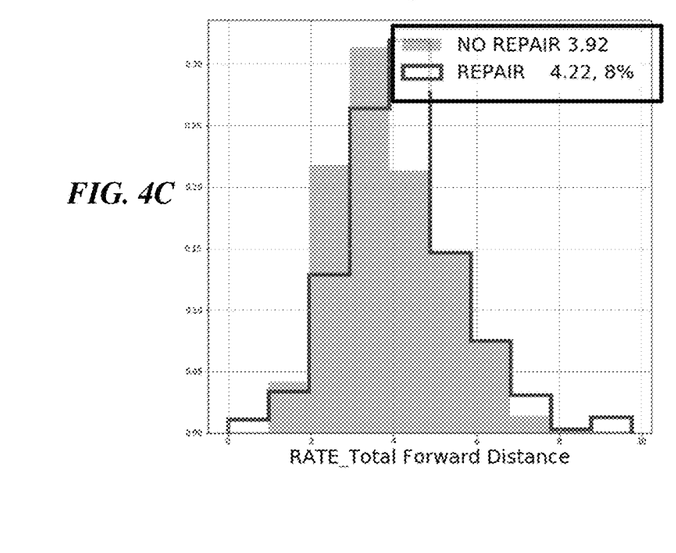
Figure 4D:
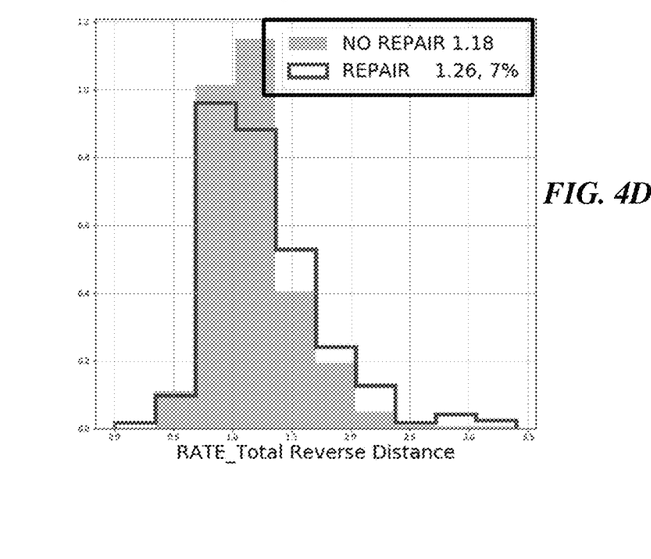

FIGS. 4A-D are charts illustrating probability distributions of predictive features for asset states close to repair time ("un-healthy states") and for assets with no repairs within the considered time period ("healthy states"). For example, FIG. 4A shows the distributions for percentage work time for repairs vs. no repairs; FIG. 4B shows the distributions for average fuel rate for repairs vs. no repairs; FIG. 4C shows the distributions for rate of total forward distance for repairs vs. no repairs; and FIG. 4D shows the distributions for rate of total reverse distance for repairs vs. no repairs. With reference to FIG. 4A, each chart shows the predictive feature (e.g., percentage work time) distribution for a group of machines that have had repairs in the following two months (e.g., distribution 402) and the predictive feature (e.g., percentage work time) distribution for a group of machines that have had no repairs (e.g., distribution 404). The predictive features with the highest difference between distributions can be identified as the selected predictive features. For example, average fuel rate (8%), rate of total forward distance (which is the average forward speed) (8%), and rate of total reverse distance (which is the average reverse speed) (7%) have a higher difference between repair and no repair than percentage work time (2%). Accordingly, in some embodiments, the plurality of machine predictive features can comprise average fuel rate, rate of total forward distance, and rate of total reverse distance. In some embodiments, the system can include all features that exhibit statistically significant differences between repairs and no repairs.

Figure 5:
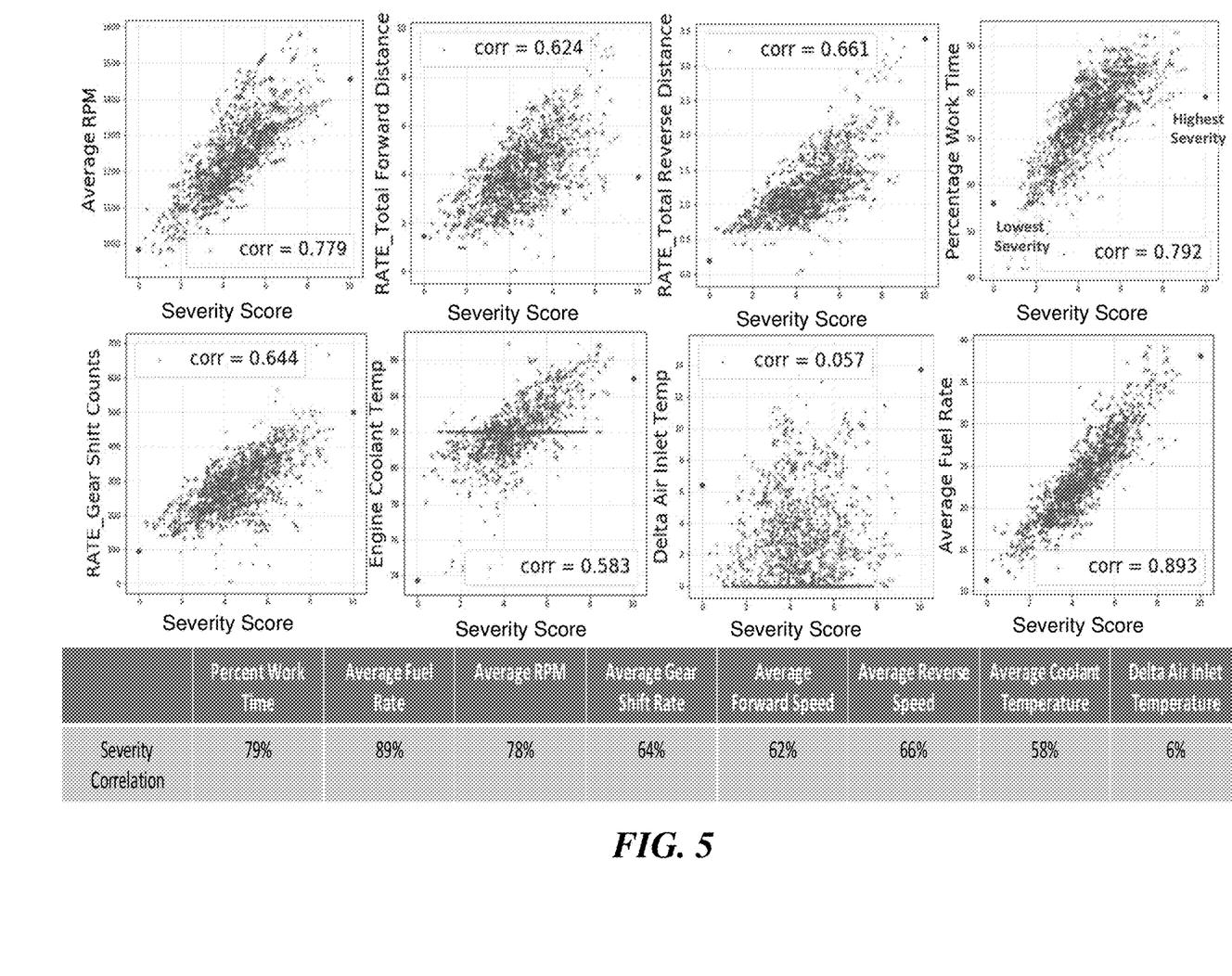
FIG. 5 illustrates a set of charts showing correlations between the severity score and various predictive features.

FIG. 5 illustrates a set of charts showing correlations between the severity score and various predictive features. Validating the severity model can comprise calculating a severity score for each of a plurality of machines and calculating a correlation between the severity scores and the corresponding predictive feature values. In other words, each chart plots the severity score and corresponding predictive feature value for each of a plurality of machines (i.e., each point on the chart is a different machine). The severity model is validated against the predictive features when the correlation exceeds a selected correlation threshold, for example. In some embodiments the correlation threshold can be 50%. As shown in FIG. 5, all of the predictive features exceed a correlation threshold of 50% except delta air inlet temperature. It should be noted that the predictive features are constructed so that low (high) values correspond to low (high) Severity.

Figure 6:
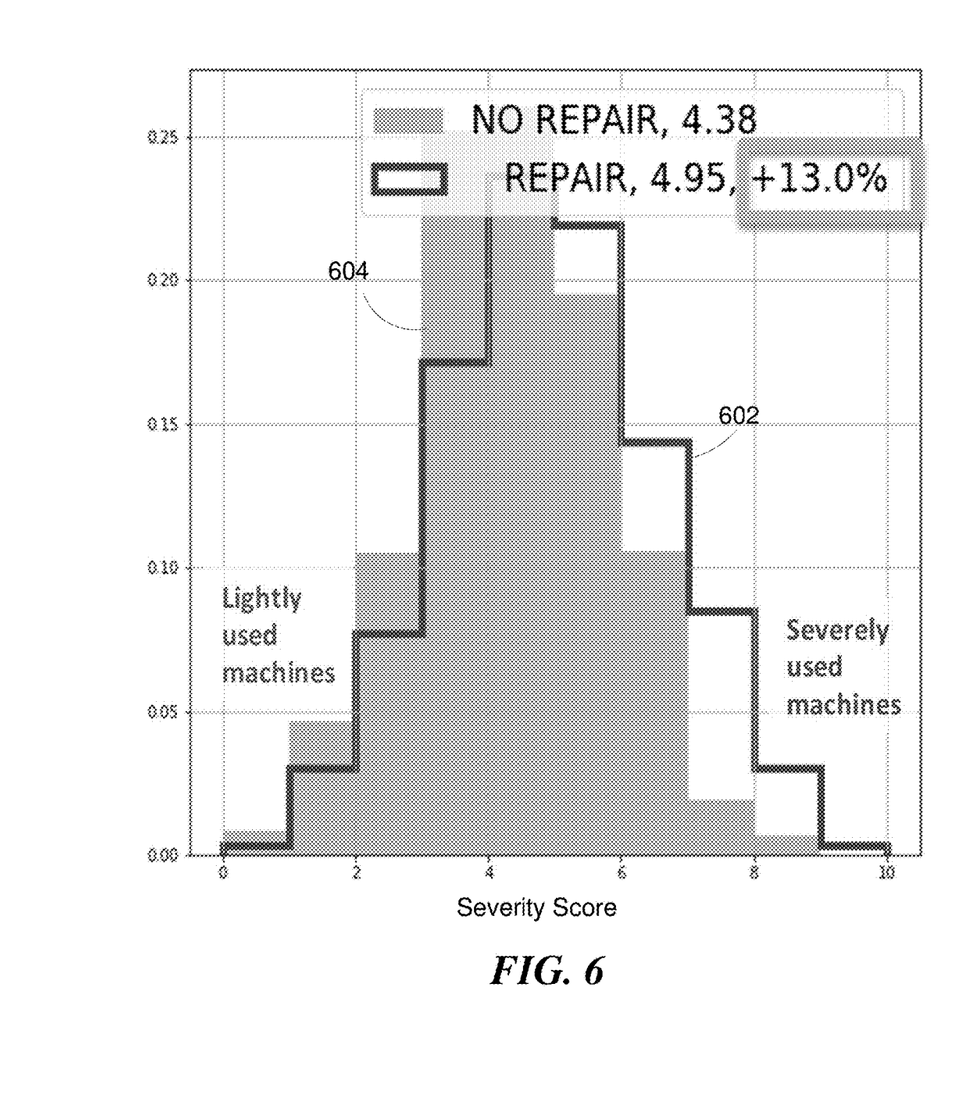
FIG. 6 is a chart illustrating probability distributions of the severity score for asset states close to repair time and for asset states far from repair time.

FIG. 6 is a chart illustrating probability distributions of repairs vs. no repairs in relation to severity score for a particular model of machine. Distribution 602 illustrates the severity scores for machines that have had repairs in e.g., the following two months and distribution 604 illustrates the severity scores for machines that have not had repairs. In the depicted embodiment, the machine usage severity score is presented on a scale of 0 to 10. Based on this chart, a severity threshold of five or higher can be selected for determining if an individual machine needs attention. Severity score models, repairs vs. no repairs distributions, and corresponding severity thresholds can be generated for different models and types of machines as well as major components and/or subassemblies.

Figure 7:
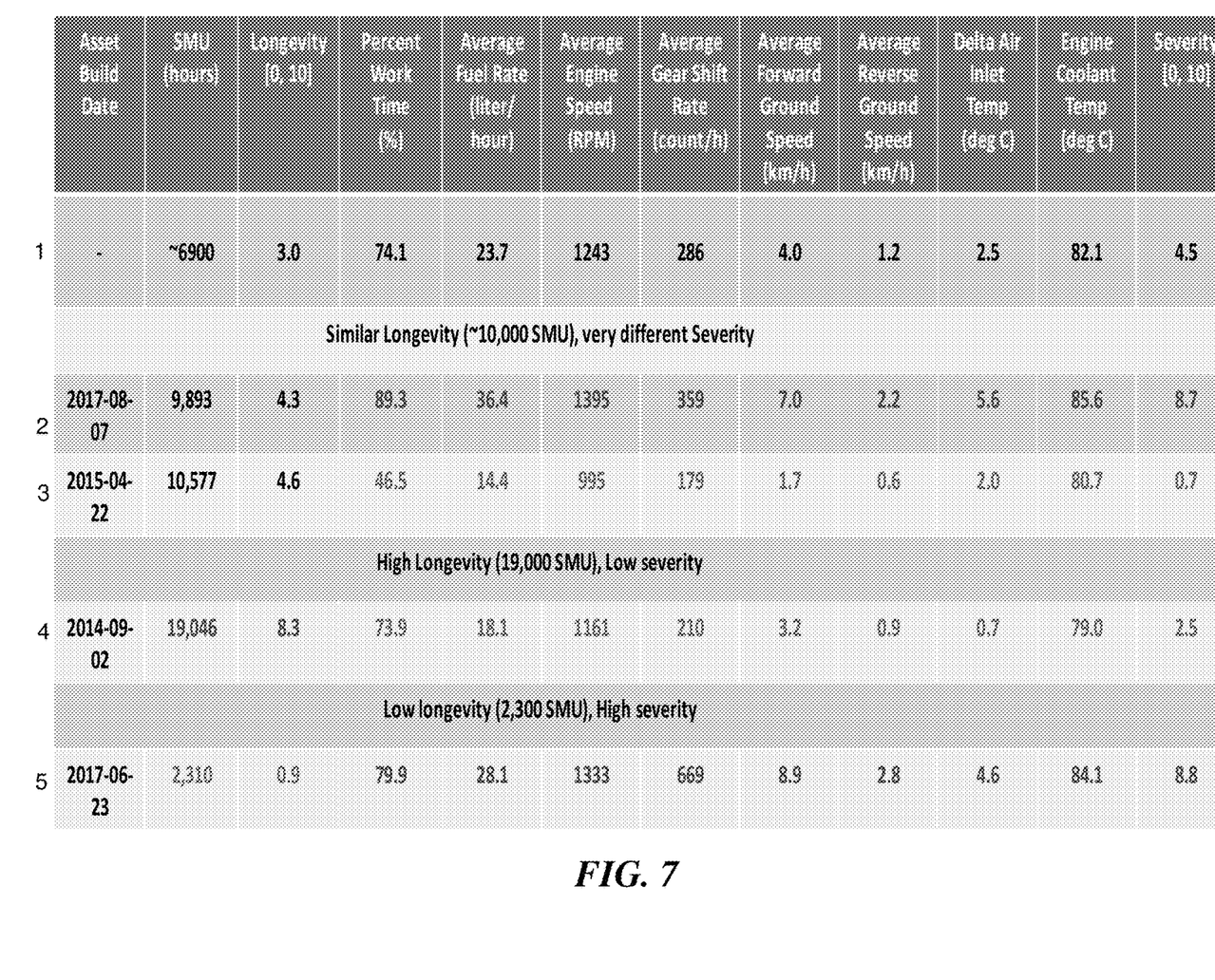
FIG. 7 is a table illustrating the predictive value of the severity score for several machine usage scenarios.

FIG. 7 is a table illustrating the predictive value of the severity score for several machine usage scenarios for individual deployed machines 1-5. For example, machines 2 and 3 have similar longevity but very different severity scores. Machine 4 has high longevity but low severity and machine 5 has low longevity but high severity. There is no significant correlation between severity score and utilization rate or between severity score and longevity. Therefore, severity score adds new information in addition to longevity and utilization rate.

Figure 11A:
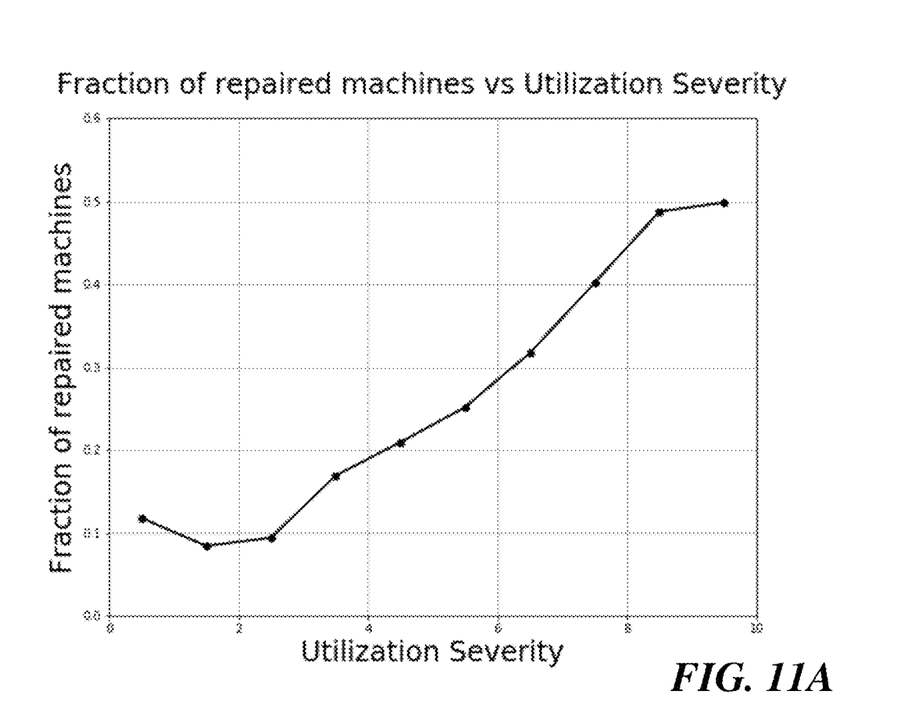
FIG. 11A is a chart illustrating the fraction of machines repaired during a specified time period as function of utilization severity.
Figure 11B:
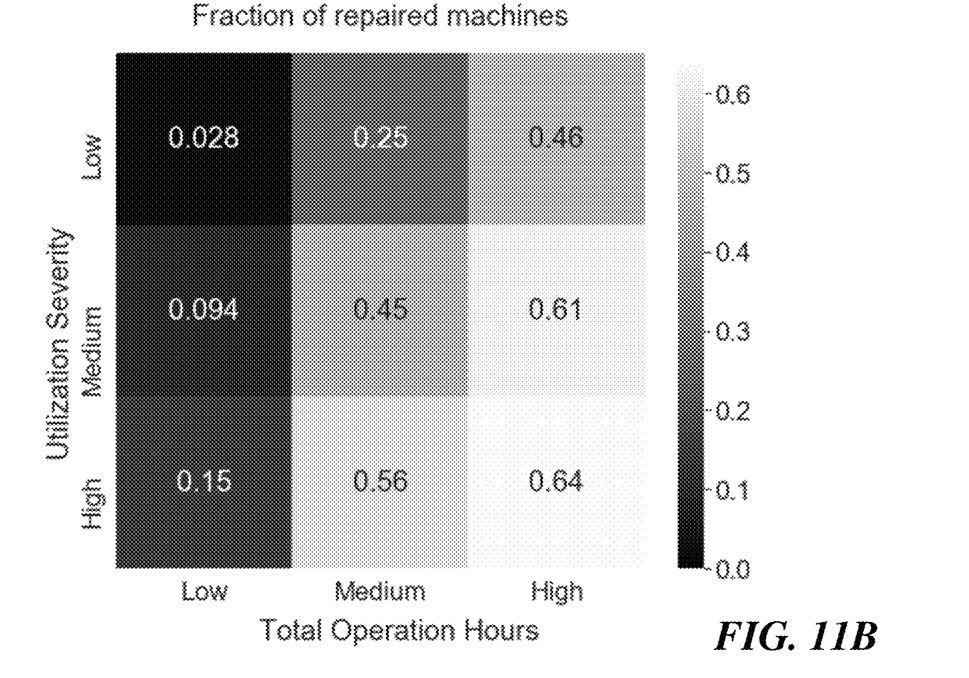
FIG. 11B is a chart illustrating the fraction of machines repaired during the specified time period as a function of both utilization severity and operation hours.

FIGS. 11A and 11B illustrate a data sample including approximately 30,000 D6 dozer machines. Among them, slightly less than one third had undergone major repairs between 2018 Jan. 1 and 2021 Jun. 1. FIG. 11A shows the fraction of machines repaired during the above time period as a function of utilization severity (data was binned in 10 buckets of severity: 0-1, 1-2, . . . 9-10). FIG. 11B shows the fraction of machines repaired during the above time period as a function of both utilization severity and operation hours. In this case data was binned in 9 buckets, 3 buckets for severity (0-3.3, 3.3-6.6, 6.6-1) and 3 buckets for operation hours (0, 3,333, 3,333-6,666, 6,666-10,000).

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 8:
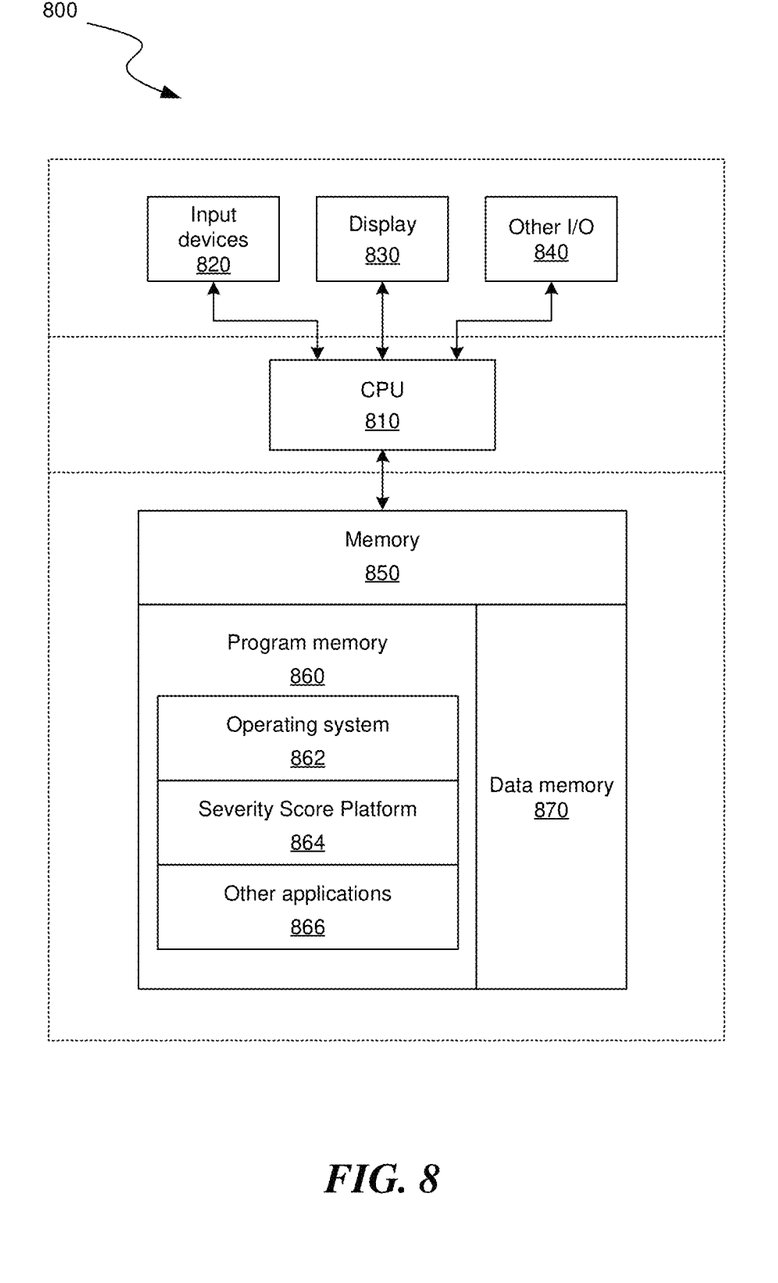
FIG. 8 is a block diagram illustrating an overview of devices on which some implementations can operate.

Several implementations are discussed below in more detail in reference to the figures. FIG. 8 is a block diagram illustrating an overview of devices on which some implementations of the disclosed technology can operate. Device 800 can include one or more input devices 820 that provide input to the CPU (processor) 810, notifying it of actions. The actions are typically mediated by a hardware controller that interprets the signals received from the input device and communicates the information to the CPU 810 using a communication protocol. Input devices 820 include, for example, a mouse, a keyboard, a touchscreen, an infrared sensor, a touchpad, a wearable input device, a camera- or image-based input device, a microphone, or other user input devices.

CPU 810 can be a single processing unit or multiple processing units in a device or distributed across multiple devices. CPU 810 can be coupled to other hardware devices, for example, with the use of a bus, such as a PCI bus or SCSI bus. The CPU 810 can communicate with a hardware controller for devices, such as for a display 830. Display 830 can be used to display text and graphics. In some examples, display 830 provides graphical and textual visual feedback to a user. In some implementations, display 830 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 840 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 800 also includes a communication device capable of communicating wirelessly or wire-based with a network node. The communication device can communicate with another device or a server through a network using, for example, TCP/IP protocols. Device 800 can utilize the communication device to distribute operations across multiple network devices.

The CPU 810 can have access to a memory 850. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 850 can include program memory 860 that stores programs and software, such as an operating system 862, severity score platform 864, and other application programs 866. Memory 850 can also include data memory 870 that can include database information, etc., which can be provided to the program memory 860 or any element of the device 800.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 9:
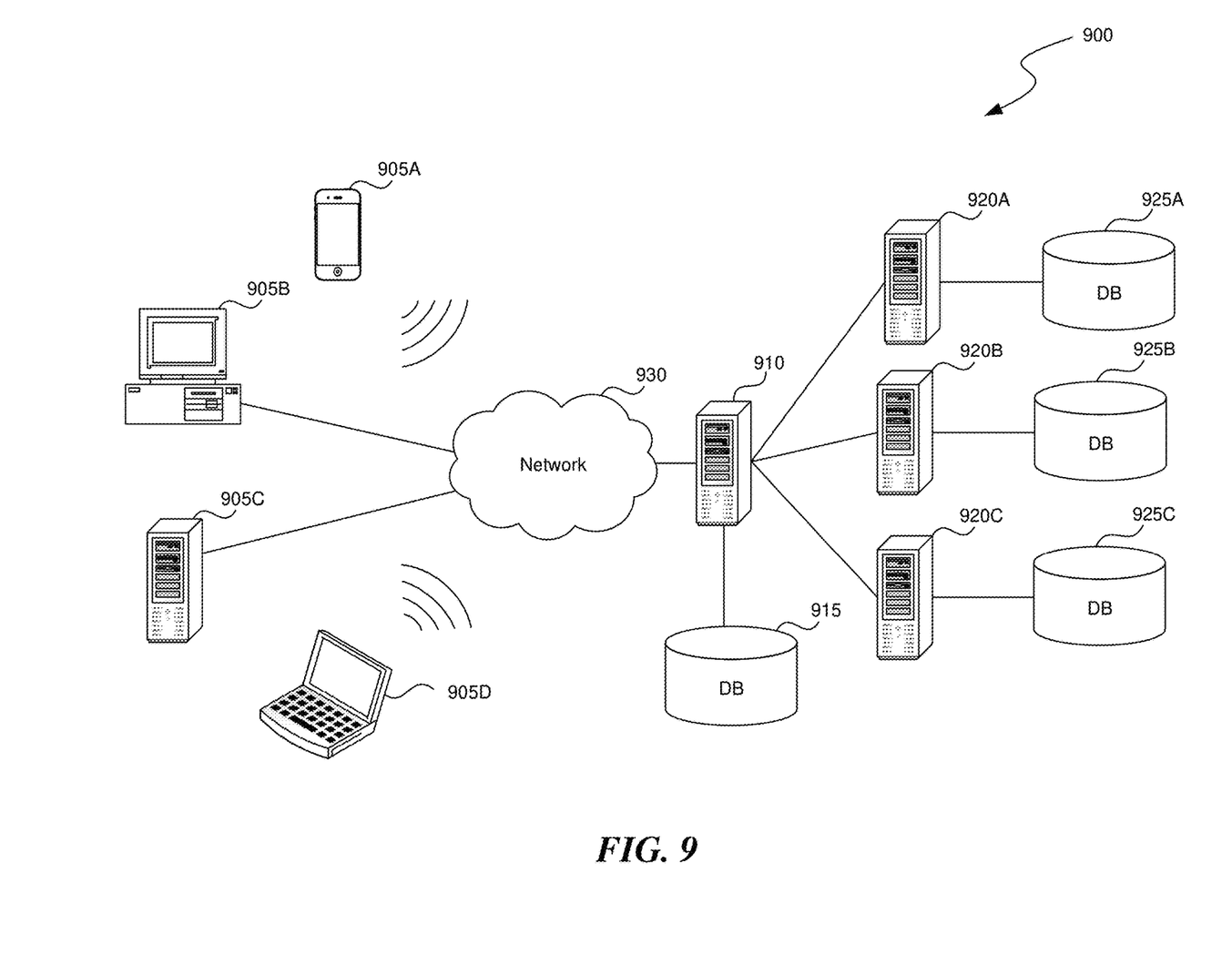
FIG. 9 is a block diagram illustrating an overview of an environment in which some implementations can operate.

FIG. 9 is a block diagram illustrating an overview of an environment 900 in which some implementations of the disclosed technology can operate. Environment 900 can include one or more client computing devices 905A-D, examples of which can include device 400. Client computing devices 905 can operate in a networked environment using logical connections through network 930 to one or more remote computers, such as a server computing device 910.

In some implementations, server computing device 910 can be an edge server that receives client requests and coordinates fulfillment of those requests through other servers, such as servers 920A-C. Server computing devices 910 and 920 can comprise computing systems, such as device 800. Though each server computing device 910 and 920 is displayed logically as a single server, server computing devices can each be a distributed computing environment encompassing multiple computing devices located at the same or at geographically disparate physical locations. In some implementations, each server computing device 920 corresponds to a group of servers.

Client computing devices 905 and server computing devices 910 and 920 can each act as a server or client to other server/client devices. Server 910 can connect to a database 915. Servers 920A-C can each connect to a corresponding database 925A-C. As discussed above, each server 920 can correspond to a group of servers, and each of these servers can share a database or can have their own database. Databases 915 and 925 can warehouse (e.g., store) information. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but can also be other wired or wireless networks. Network 930 may be the Internet or some other public or private network. Client computing devices 905 can be connected to network 930 through a network interface, such as by wired or wireless communication. While the connections between server 910 and servers 920 are shown as separate connections, these connections can be any kind of local, wide area, wired, or wireless network, including network 930 or a separate public or private network.

Figure 10:
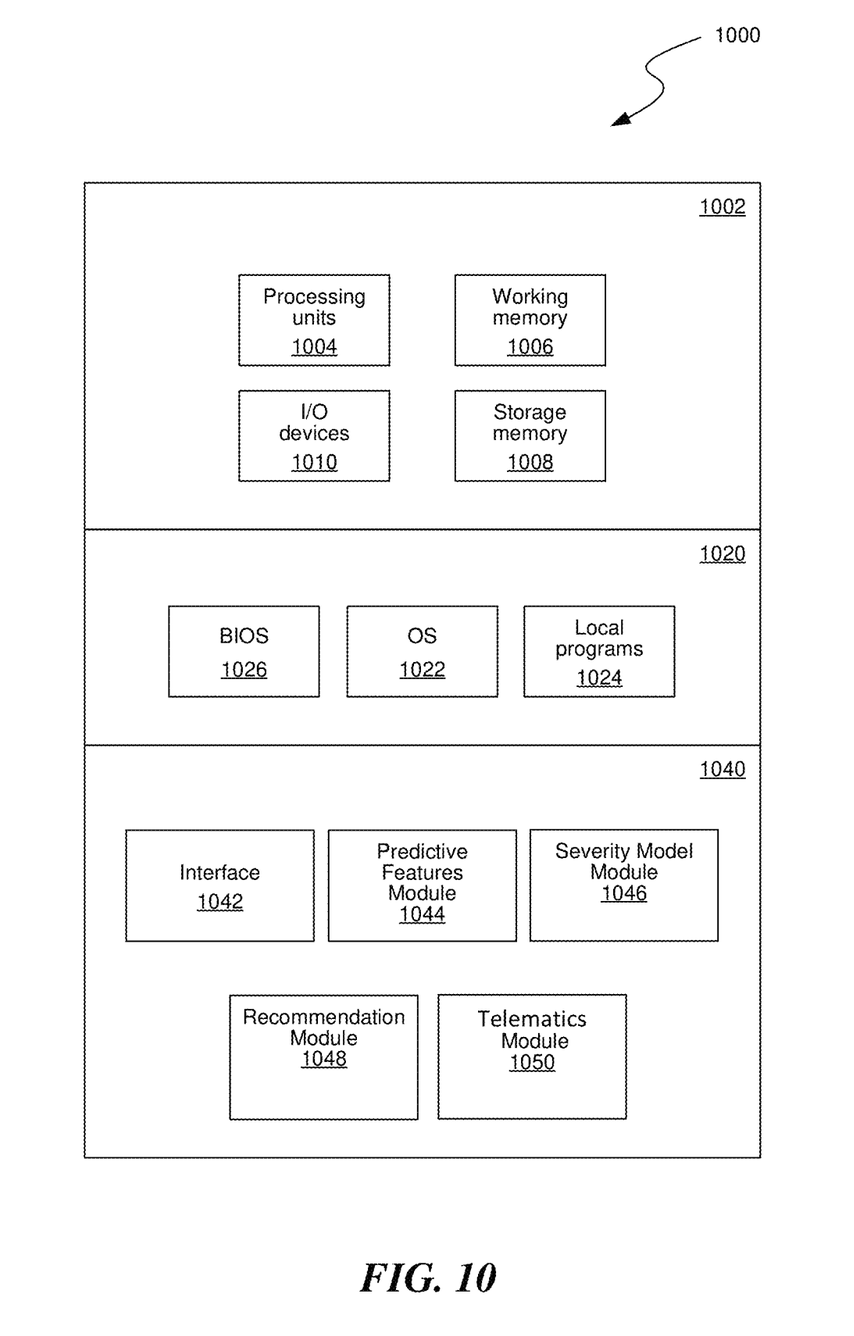
FIG. 10 is a block diagram illustrating components which, in some implementations, can be used in a system employing the disclosed technology.

FIG. 10 is a block diagram illustrating components 1000 which, in some implementations, can be used in a system employing the disclosed technology. The components 1000 include hardware 1002, general software 1020, and specialized components 1040. As discussed above, a system implementing the disclosed technology can use various hardware, including processing units 1004 (e.g., CPUs, GPUs, APUs, etc.), working memory 1006, storage memory 1008, and input and output devices 1010. Components 1000 can be implemented in a client computing device such as client computing devices 905 or on a server computing device, such as server computing device 910 or 920.

General software 1020 can include various applications, including an operating system 1022, local programs 1024, and a basic input output system (BIOS) 1026. Specialized components 1040 can be subcomponents of a general software application 1020, such as local programs 1024. Specialized components 1040 can include a Predictive Features Module 1044, a Severity Model Module 1046, a Recommendation Module 1048, a Telematics Module 1050, and components that can be used for transferring data and controlling the specialized components, such as Interface 1042. In some implementations, components 1000 can be in a computing system that is distributed across multiple computing devices or can be an interface to a server-based application executing one or more of specialized components 1040.

Those skilled in the art will appreciate that the components illustrated in FIGS. 8-10 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a system for determining machine usage severity can include a Predictive Features Module 1044, a Severity Model Module 1046, a Recommendation Module 1048, and a Telematics Module 1050 (FIG. 10). In operation, the Predictive Features Module 1044 can select a plurality of predictive features for a type of machine, such as an excavator, by identifying features that correlate with repairs being performed within a repair time period, e.g., two months, beginning after an activity time period. For example, average fuel rate, average forward ground speed, and average reverse ground speed have been found to be good predictive features for prioritized repairs, performed within e.g., two months.

The severity model module 1046 can collect repair data from repair information database 104 and telematics data from Telematics Module 1050. The Telematics Module 1050 gathers data from a plurality of sensors 22, 24, and 26 disposed on a machine 20(1), such as an excavator. The severity model module 1046 calculates the selected predictive features from the telematics data. The severity model module 1046 also creates a severity model based on the plurality of predictive features. The severity model can be validated with the plurality of predictive features and corresponding repair data for each of a plurality of machines.

The recommendation module 1048 receives telematics data from a deployed machine and calculates the predictive features for the deployed machine. The predictive feature values can be fed into the severity model to calculate a machine usage severity score for the deployed machine. The recommendation module 1048 displays a recommendation to perform maintenance, overhaul, or redeploy the machine to a less severe application when the machine usage severity score exceeds a selected threshold. The recommendation module 1048 can present the recommendation via a web portal, mobile application, or the like. The severity score information and/or recommendations are typically presented to service center personnel; however, this information can be presented to machine owners, fleet operators, site managers, and/or individual machine operators. In some embodiments, the severity score information can be presented to an operator with a status indicator mounted adjacent the machine's controls to constantly indicate the machine's condition i.e., severity score. The status indictor can comprise a multi-color light (e.g., green, yellow, and red). The severity score can indicate to an operator that the machine they are using has had severe usage and that the operator may want to adjust how they use the machine, for example. In some embodiments, machines in a fleet or geographic region can be ranked based on severity score to prioritize which machines receive service or replacement, for example.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for determining machine usage severity, comprising:
   collecting repair data for a plurality of machines over a repair time period;
   collecting telematics data from a plurality of sensors for each of the plurality of machines over an activity time period;
   calculating a plurality of predictive features from the telematics data for each of the plurality of machines;
   creating a severity model based on the plurality of predictive features;
   validating the severity model with the plurality of predictive features and corresponding repair data for each of the plurality of machines, wherein validating the severity model comprises calculating a severity score for each of the plurality of machines and calculating a correlation between the severity score and each of the plurality of predictive features;
   receiving telematics data from a plurality of sensors on a deployed machine corresponding to a deployed period of time;
   calculating a plurality of machine predictive features from the telematics data for the deployed machine;
   feeding the plurality of machine predictive features for the deployed machine into the severity model to calculate a machine usage severity score for the deployed machine, wherein the machine usage severity score for the deployed machine indicates how severely that machine has been used relative to the plurality of machines; and
   displaying a recommendation to perform maintenance on the deployed machine when the machine usage severity score exceeds a selected threshold.

2. The method of claim 1, wherein the severity model comprises a Euclidian distance model.

3. The method of claim 1, wherein the plurality of machine predictive features comprise average fuel rate, average forward ground speed, and average reverse ground speed.

4. The method of claim 1, further comprising selecting the plurality of predictive features, including: identifying features that correlate with repairs being performed within the repair time period beginning after the activity time period.

5. The method of claim 4, wherein the repair time period is two months.

6. The method of claim 1, wherein the machine usage severity score is presented on a scale of 0 to 10, and wherein the selected threshold is five.

7. A system for determining machine usage severity, comprising:
   one or more processors; and
   one or more memory devices having stored thereon instructions that when executed by the one or more processors cause the one or more processors to:
   collect repair data for a plurality of machines over a repair time period;
   collect telematics data from a plurality of sensors for each of the plurality of machines over an activity time period;
   calculate a plurality of predictive features from the telematics data for each of the plurality of machines;
   create a severity model based on the plurality of predictive features;
   validate the severity model with the plurality of predictive features and corresponding repair data for each of the plurality of machines, wherein validating the severity model comprises calculating a severity score for each of the plurality of machines and calculating a correlation between the severity score and each of the plurality of predictive features;

receive telematics data from a plurality of sensors on a deployed machine corresponding to a deployed period of time;

calculate a plurality of machine predictive features from the telematics data for the deployed machine;

feed the plurality of machine predictive features for the deployed machine into the severity model to calculate a machine usage severity score for the deployed machine, wherein the machine usage severity score for the deployed machine indicates how severely that machine has been used relative to the plurality of machines; and display a recommendation to perform maintenance on the deployed machine when the machine usage severity score exceeds a selected threshold.

8. The system of claim 7, wherein the severity model comprises a Euclidian distance model.

9. The system of claim 7, wherein the plurality of machine predictive features comprise average fuel rate, average forward ground speed, and average reverse ground speed.

10. The system of claim 7, further comprising instructions to select the plurality of predictive features, including: identifying features that correlate with repairs being performed within the repair time period beginning after the activity time period.

11. The system of claim 10, wherein the repair time period is two months.

12. The system of claim 7, wherein the machine usage severity score is presented on a scale of 0 to 10, and wherein the selected threshold is five.

13. One or more non-transitory computer-readable media storing computer-executable instructions that, when executed by one or more processors, cause the one or more processors to perform operations comprising:

receiving telematics data from a plurality of sensors on a machine performing an activity;

collecting repair data for a plurality of machines over a repair time period;

collecting telematics data from a plurality of sensors for each of the plurality of machines over an activity time period;

calculating a plurality of predictive features from the telematics data for each of the plurality of machines;

creating a severity model based on the plurality of predictive features;

validating the severity model with the plurality of predictive features and corresponding repair data for each of the plurality of machines, wherein validating the severity model comprises calculating a severity score for each of the plurality of machines and calculating a correlation between the severity score and each of the plurality of predictive features;

receiving telematics data from a plurality of sensors on a deployed machine corresponding to a deployed period of time;

calculating a plurality of machine predictive features from the telematics data for the deployed machine;

feeding the plurality of machine predictive features for the deployed machine into the severity model to calculate a machine usage severity score for the deployed machine, wherein the machine usage severity score for the deployed machine indicates how severely that machine has been used relative to the plurality of machines; and displaying a recommendation to perform maintenance on the deployed machine when the machine usage severity score exceeds a selected threshold.

14. The one or more non-transitory computer-readable media of claim 13, wherein the severity model comprises a Euclidian distance model.

15. The one or more non-transitory computer-readable media of claim 13, wherein the plurality of machine predictive features comprise average fuel rate, average forward ground speed, and average reverse ground speed.

16. The one or more non-transitory computer-readable media of claim 13, further comprising selecting the plurality of predictive features, including: identifying features that correlate with repairs being performed within the repair time period beginning after the activity time period.

17. The one or more non-transitory computer-readable media of claim 16, wherein the repair time period is two months.

* * * * *